(12) United States Patent
Kwahk et al.

(10) Patent No.: US 9,389,783 B2
(45) Date of Patent: Jul. 12, 2016

(54) METHOD FOR ASSOCIATING AN ONSCREEN KEYBOARD WITH A DISPLAYED APPLICATION WINDOW AND DISPLAY APPARATUS APPLYING THE SAME

(75) Inventors: Ji-young Kwahk, Seongnam-si (KR);
Giang-yoon Kwon, Seoul (KR);
Jin-young Jeon, Seoul (KR);
Sang-woong Hwang, Yongin-si (KR);
Jee-sun Yoon, Seoul (KR)

(73) Assignee: Samsung Electronics Co., Ltd (KR)

( * ) Notice: Subject to any disclaimer, the term of this patent is extended or adjusted under 35 U.S.C. 154(b) by 175 days.

(21) Appl. No.: 13/377,393

(22) PCT Filed: Jun. 4, 2010

(86) PCT No.: PCT/KR2010/003600
§ 371 (c)(1),
(2), (4) Date: Dec. 9, 2011

(87) PCT Pub. No.: WO2010/143842
PCT Pub. Date: Dec. 16, 2010

(65) Prior Publication Data
US 2012/0075231 A1     Mar. 29, 2012

(30) Foreign Application Priority Data
Jun. 9, 2009 (KR) .......................... 10-2009-0051042

(51) Int. Cl.
*G06F 3/0488* (2013.01)

(52) U.S. Cl.
CPC .......... *G06F 3/04886* (2013.01); *G06F 3/0488* (2013.01); *G06F 3/04883* (2013.01)

(58) Field of Classification Search
CPC .............. G06F 3/04886; G06F 3/0488; G06F 3/04883; G06F 3/0481
USPC .................................. 715/773, 767; 345/173
See application file for complete search history.

(56) References Cited

U.S. PATENT DOCUMENTS 5,389,745 A    2/1995   Sakamoto
5,432,897 A *  7/1995   Tatsumi et al. ............... 345/440
(Continued)

FOREIGN PATENT DOCUMENTS

CN    101241529    8/2008
JP    03-040128    2/1991
(Continued)

OTHER PUBLICATIONS

"Creating flowcharts in Visio", Bonnie Yelverton, Jan. 12, 2003, retrieved from: http://www.byelverton.net/Portfolio/Using_Visio.pdf, 12 pages.*

(Continued)

*Primary Examiner* — Li Sun
(74) *Attorney, Agent, or Firm* — The Farrell Law Firm, P.C.

(57) ABSTRACT

A method for providing a (UI) and a display apparatus to which the method is applied includes displaying an onscreen keyboard on a screen; displaying a plurality of applications on the screen, selecting one of the plurality of applications on the screen as an input target application into which to enter text using the an onscreen keyboard. Consequently, a user may easily use the onscreen keyboard on the screen on which the plurality of applications are simultaneously displayed.

24 Claims, 21 Drawing Sheets

(56) References Cited

U.S. PATENT DOCUMENTS

| | | | |
|---|---|---|---|
| 5,758,111 A * | 5/1998 | Shiratori et al. | 715/788 |
| 7,543,248 B2 | 6/2009 | Denoue et al. | |
| 2004/0001051 A1 | 1/2004 | Tomizawa et al. | |
| 2004/0130575 A1 | 7/2004 | Tai et al. | |
| 2004/0230912 A1 | 11/2004 | Clow et al. | |
| 2005/0099403 A1 | 5/2005 | Kraus et al. | |
| 2005/0125740 A1 * | 6/2005 | Clow et al. | 715/794 |
| 2006/0033724 A1 | 2/2006 | Chaudhri et al. | |
| 2006/0112335 A1 | 5/2006 | Hofmeister et al. | |
| 2006/0271521 A1 | 11/2006 | Denoue et al. | |
| 2007/0171210 A1 | 7/2007 | Chaudhri et al. | |
| 2007/0204236 A1 * | 8/2007 | Bahn et al. | 715/810 |
| 2008/0062318 A1 * | 3/2008 | Ellis et al. | 348/564 |
| 2010/0037157 A1 * | 2/2010 | Chang et al. | 715/764 |

FOREIGN PATENT DOCUMENTS

| | | |
|---|---|---|
| JP | 11272392 | 10/1999 |
| JP | 2001-356870 | 12/2001 |
| JP | 2003112414 | 4/2003 |
| JP | 2004-030536 | 1/2004 |
| JP | 2006-189920 | 7/2006 |
| JP | 2006-338667 | 12/2006 |
| JP | 2008-033844 | 2/2008 |
| JP | 2008-112414 | 5/2008 |
| JP | 2009-509235 | 3/2009 |
| KR | 1020070010557 | 1/2007 |

OTHER PUBLICATIONS

European Search Report dated Apr. 29, 2015 issued in counterpart application No. 10786325.0-1959.

Korean Office Action dated Aug. 21, 2015 issued in counterpart application No. 10-2009-0051042, 12 pages.

European Search Report dated Mar. 2, 2016 issued in counterpart application No. 10786325.0-1959, 5 pages.

* cited by examiner

METHOD FOR ASSOCIATING AN ONSCREEN KEYBOARD WITH A DISPLAYED APPLICATION WINDOW AND DISPLAY APPARATUS APPLYING THE SAME

PRIORITY

This application is a National Phase Entry of PCT International Application No. PCT/KR2010/003600, which was filed Jun. 4, 2010, and claims priority to Korean Patent Application No. 10-2009-0051042, which was filed in the Korean Intellectual Property Office, on Jun. 9, 2009, the content of each of which is incorporated herein by reference.

BACKGROUND OF THE INVENTION

1. Field of the Invention

The present invention relates generally to a method of providing a User Interface (UI), and a display apparatus to which the method is applied, and more particularly, to a method of providing a UI for using an onscreen keyboard in an application and a display apparatus to which the method is applied.

2. Description of the Related Art

An increasing number of display devices have been designed with touch screens as their UI devices. Touch screens are devices that detect the presence and location of a touch thereon and perform predefined processing based on the results of the detection with the aid of software, thereby allowing users to directly enter text, commands and/or instructions without the need to use a keyboard. Touch screens have recently become one of the most popular UI devices because they are easy and intuitive to use.

Onscreen keyboards are keyboards that are provided on a touch screen. That is, onscreen keyboards are keyboards that are displayed on a touch screen, and may enter various input via the touch screen in almost the same manner as typical keyboards. Therefore, by using an onscreen keyboard, users may enter text or instructions to a touch screen without a requirement of a physical keyboard.

However, where a plurality of applications are being executed at the same time, it may often be difficult to determine for which of the plurality of applications an onscreen keyboard is being used.

Therefore, a method is needed to facilitate the use of an onscreen keyboard.

SUMMARY OF THE INVENTION

Accordingly, the present invention has been made to solve the above-stated problems occurring in the prior art, and provides a method of providing a UI that selects a target application of an onscreen keyboard from among a plurality of applications in response to a user manipulation of onscreen keyboard, and a display apparatus to which the method is applied.

According to an aspect of the present invention, there is provided a method of providing a UI, the method including displaying an onscreen keyboard on a screen; displaying a plurality of applications on the screen; and selecting one of the plurality of applications as a target application into which to enter text using the onscreen keyboard.

According to another aspect of the present invention, there is provided a display apparatus including a touch screen which receives a touch input from a user and displays an onscreen keyboard and a plurality of applications thereon; and a controller which selects one of the plurality of applications as a target application into which to enter text using the onscreen keyboard in response to user manipulation of the onscreen keyboard via the touch screen.

According to another aspect of the present invention, there is provided a method of providing a UI, the method including displaying a command input tool on a screen; displaying a plurality of applications on the screen; and selecting one of the plurality of applications as a target application into which to enter text using the command input tool in response to a user manipulation of the command input tool.

According to another aspect of the present invention, there is provided a display apparatus including a touch screen which receives a touch input from a user and displays a command input tool and a plurality of applications thereon; and a controller which selects one of the plurality of applications as a target application into which to enter text using the command input tool in response to user manipulation of the command input tool via the touch screen.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE EMBODIMENTS OF THE PRESENT INVENTION

Various embodiments of the present invention will be described in detail with reference to the accompanying drawings. It will be apparent to those of ordinary skill in the art that the present invention may be embodied in various forms and should not be construed as limited to the embodiments described herein.

Figure 1:
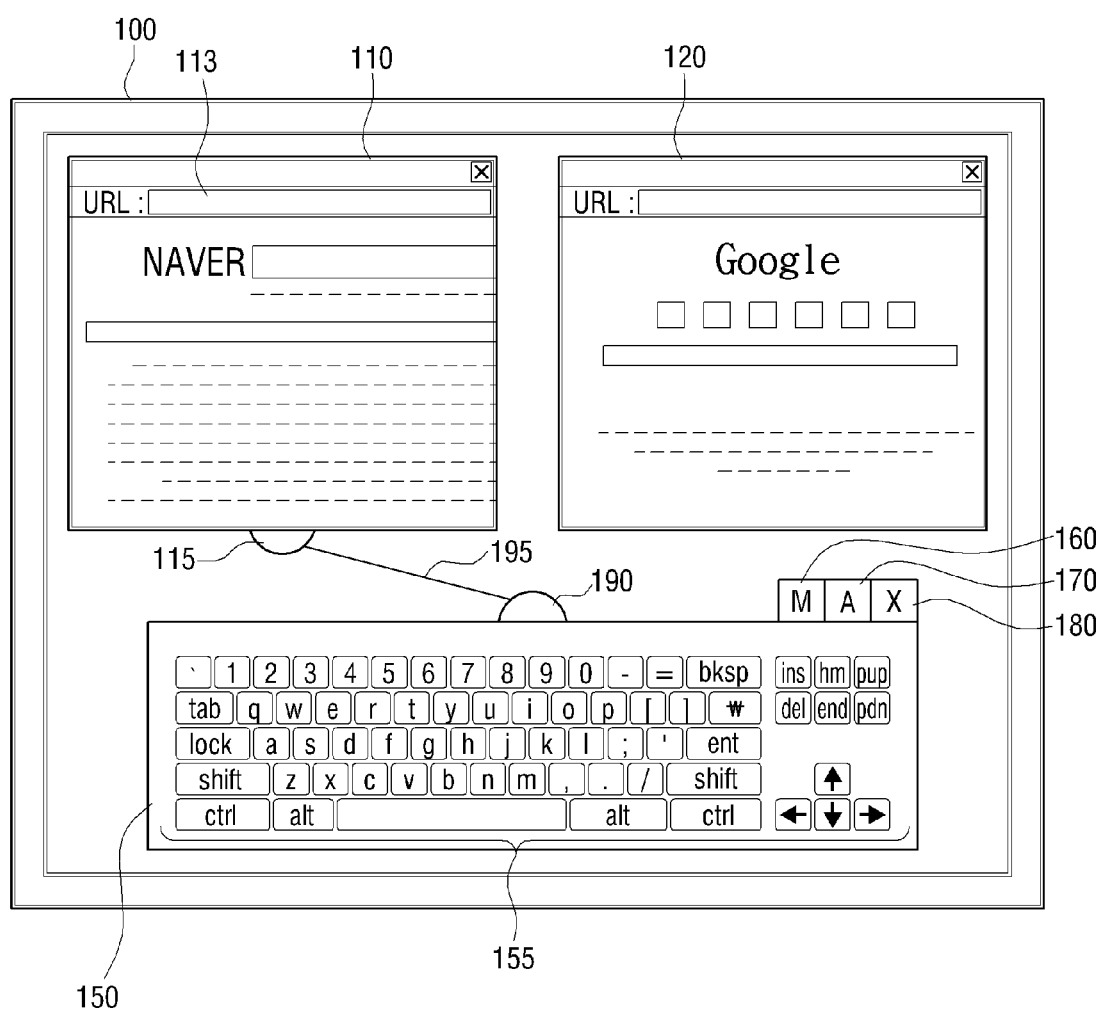
FIG. 1 is a diagram illustrating an example of a display screen displaying a first application, a second application, and an onscreen keyboard, according to an embodiment of the present invention.

FIG. 1 illustrates a display screen that displays a first application 110, a second application 120, and an onscreen keyboard 150.

Referring to FIG. 1, the first application 110, which is displayed on the screen of a display apparatus 100, is connected to the onscreen keyboard 150. That is, a target application into which to enter text using the onscreen keyboard 150 is the first application 110.

Therefore, in response to a user selecting a Uniform Resource Locator (URL) input section 113 and entering one or more characters to the onscreen keyboard 150, the entered characters may be input into the URL input section 113. To realize the onscreen keyboard 150, the display apparatus 100 is equipped with a touch screen.

As illustrated in FIG. 1, the onscreen keyboard 150 is displayed on the screen of the display apparatus 100, and includes a plurality of text input key buttons 155, a manual connection button 160, an automatic connection button 170, an end button 180, and a connection icon 190.

The text input key buttons 155 may be buttons for entering text. The text input key buttons 155 may include a plurality of key buttons that are arranged in the same manner as those of a hardware keyboard, or may include less, simpler key buttons than a hardware keyboard. The user may enter one or more desired characters by selectively touching the text input key buttons 155.

The manual connection button 160 may be a button for manually selecting a target application for the onscreen keyboard 150. In response to the manual connection button 160 being touched, the display apparatus 100 may select a target application for the onscreen keyboard 150 in response to the user's subsequent manipulation of the onscreen keyboard 150.

For example, in response to the manual connection button 160 being touched and the connection icon 190 being dragged and dropped at the first application 110, the display apparatus 100 may select the first application 110 as the target application of the onscreen keyboard 150. As a result, as illustrated in FIG. 1, the connection icon 190 of the onscreen keyboard 150 and a connection icon 115 of the first application 110 may be connected by an indicator 195, which is line-shaped.

In another example, the display apparatus 100 may allow the onscreen keyboard 150 and an application to be connected manually by a dual touch. More specifically, in response to the manual connection button 160 being touched and then the onscreen keyboard 150 and the first application 110 both being touched, the display apparatus 100 may select the first application 110 as the target application of the onscreen keyboard 150.

The onscreen keyboard 150 and an application may be manually connected in various manners, other than those set forth herein.

The automatic connection button 170 may be a button for entering a command to automatically connect the onscreen keyboard 150 and an application. In response to the automatic connection button 170 being touched, the display apparatus 100 may select an application that is displayed within a closest vicinity of the onscreen keyboard 150 as the target application of the onscreen keyboard 150.

The end button 180 may be a button for entering a command to terminate the use of the onscreen keyboard 150.

The connection icon 190 may serve as a connection point from which the indicator 195, which connects the onscreen keyboard 150 and the first application 110, is drawn. The connection icon 190 may be subject to a drag-and-drop during the manual connection between the onscreen keyboard 150 and an application, and may thus serve as an intermediary between the onscreen keyboard 150 and an application to be connected to the onscreen keyboard 150.

The indicator 195 may connect the onscreen keyboard 150 and the target application of the onscreen keyboard 150. Accordingly, the target application of the onscreen keyboard 150 is easily visually identified by the indicator 195. Referring to FIG. 1, since the indicator 195 connects the connection icon 115 of the first application 110 and the connection icon 190 of the onscreen keyboard 150, the first application 110 may be easily identified as the target application of the onscreen keyboard 150.

In the example illustrated in FIG. 1, the indicator 195 is line-shaped. However, there is no restriction to the shape of the indicator 195 as long as the indicator 195 properly displays the connection between the onscreen keyboard 150 and the target application of the onscreen keyboard 150.

In response to the indicator 195 being touched, the display apparatus 100 may display a disconnection button for disconnecting the connection between the first application 110 and the onscreen keyboard 150.

By using an automatic or manual connection of the onscreen keyboard 150, it is possible for the user to easily select a target application to which the onscreen keyboard 150 is to be connected from among a plurality of applications.

Figure 2:
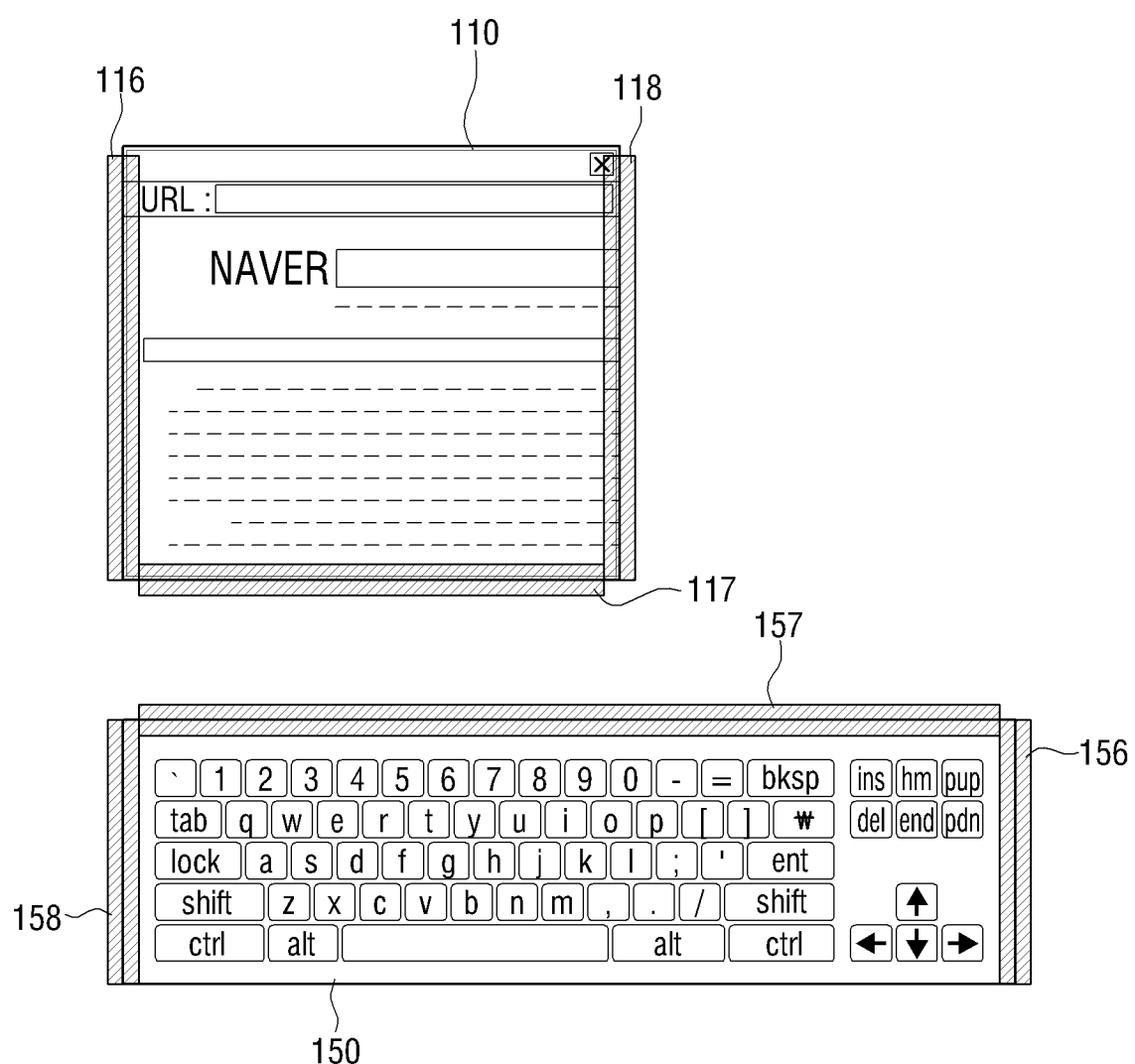
FIG. 2 is a diagram illustrating sides of the first application to which the onscreen keyboard is connected and sides of the onscreen keyboard to which the first application is connected, according to an embodiment of the present invention.

Examples of connecting the onscreen keyboard 150 and an application are described with reference to FIGS. 2 to 5. FIG. 2 is a diagram illustrating sides of the onscreen keyboard 150 to which the first application may be connected.

Referring to FIG. 2, the onscreen keyboard 150 is connected to left, lower, and right sides 116, 117, and 118 of the first application 110, and the first application 110 is connected to right, upper, and left sides 156, 157, and 158 of the onscreen keyboard 150.

Figure 3:
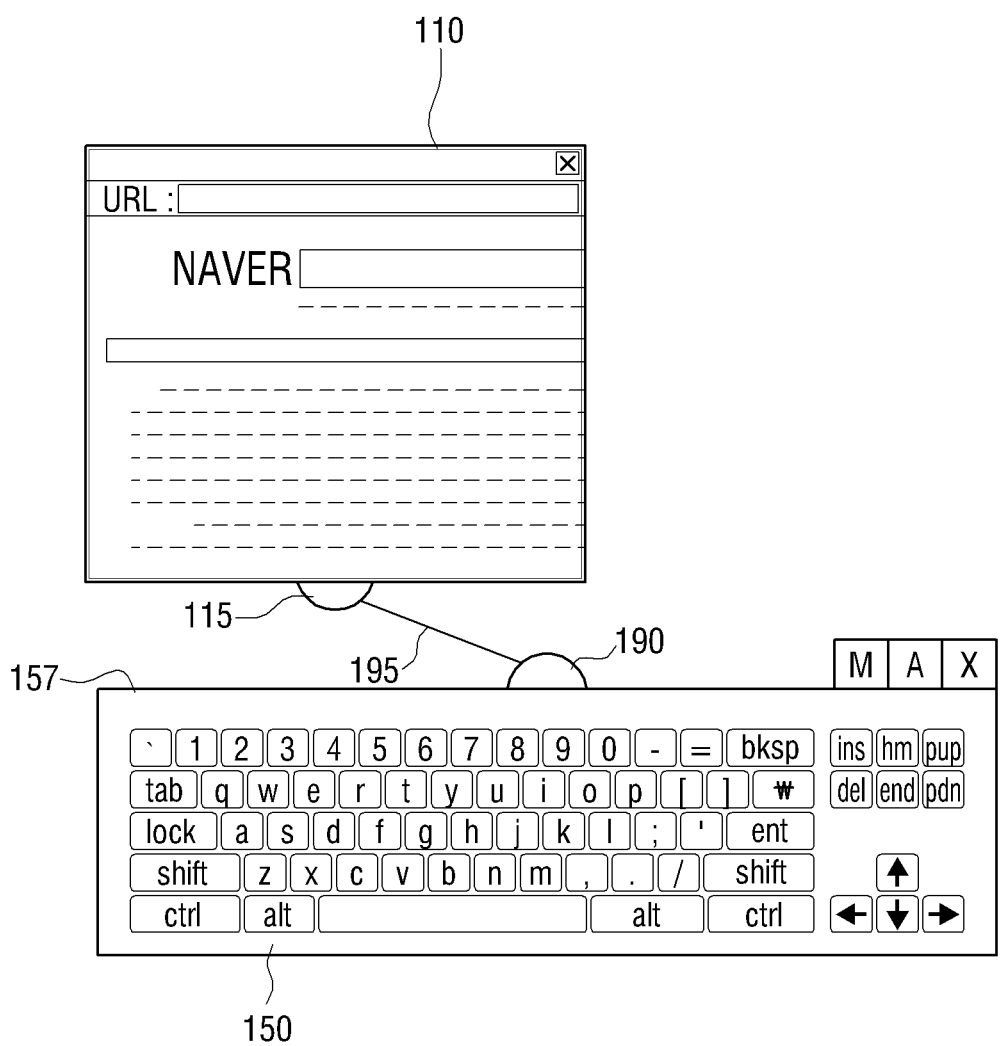
FIGS. 3 to 5 are diagrams illustrating examples of connecting the first application and the onscreen keyboard, according to an embodiment of the present invention.
Figure 4:
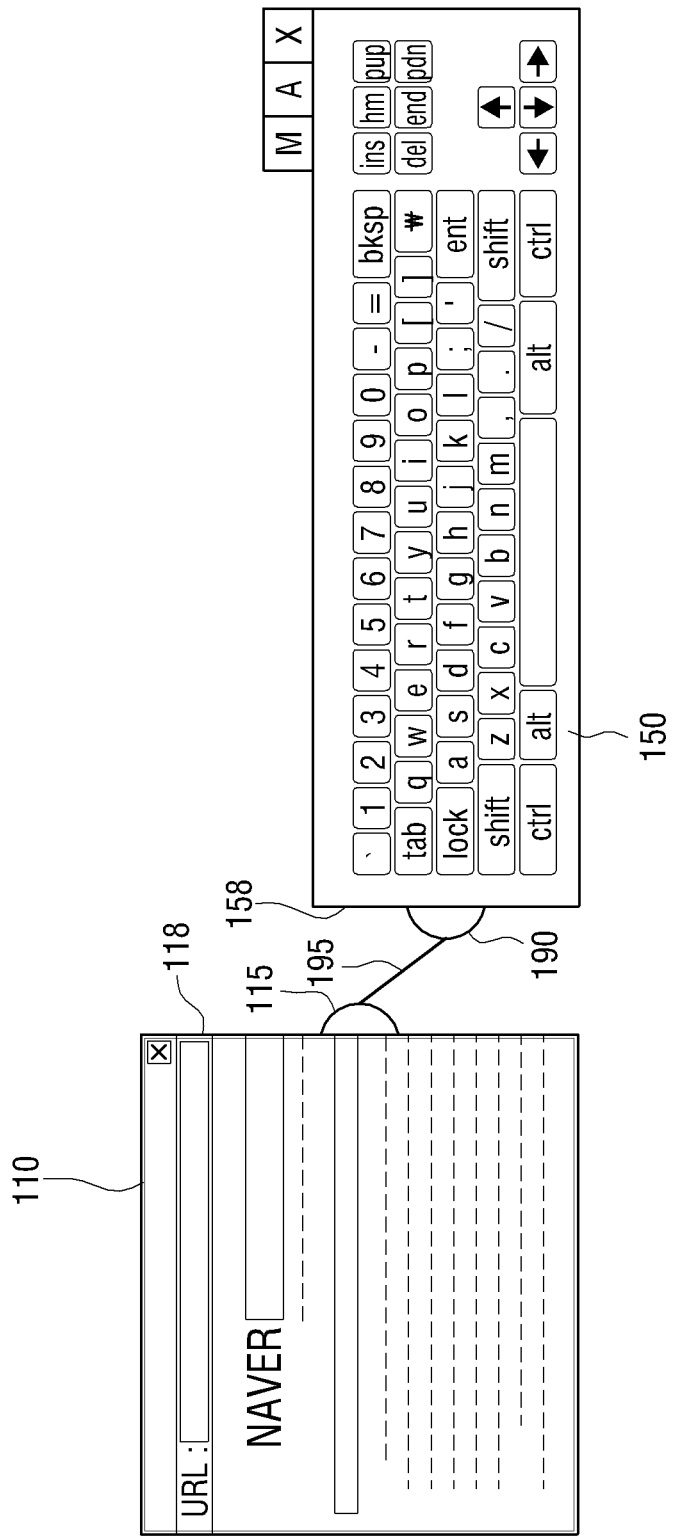
Figure 5:
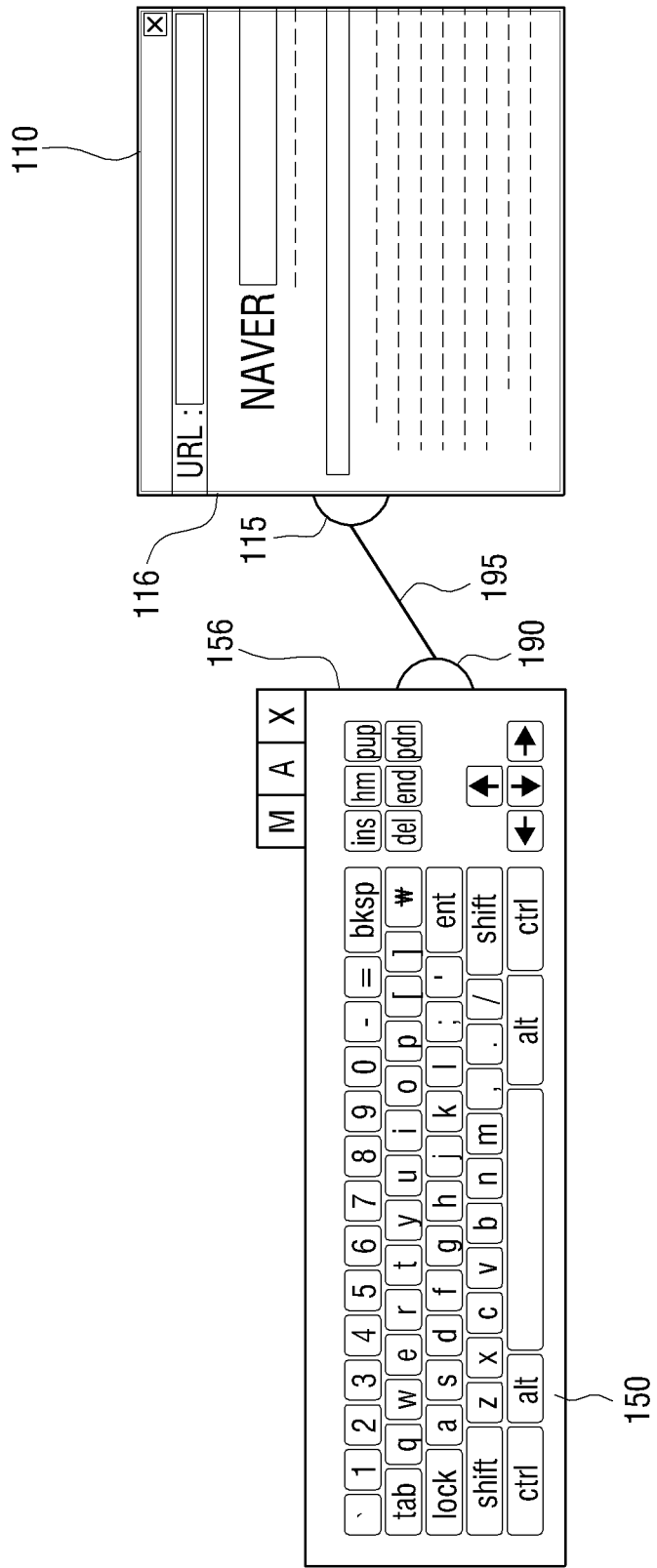

FIGS. 3 to 5 are diagrams illustrating examples of connecting the first application 110 and the onscreen keyboard 150.

Referring to FIG. 3, the lower side 117 of the first application 110 is connected to the upper side 157 of the onscreen keyboard 150. In another example, referring to FIG. 4, the right side 118 of the first application is connected to the left side 158 of the onscreen keyboard 150. In another example, referring to FIG. 5, the left side 116 of the first application 110 is connected to the right side 156 of the onscreen keyboard 150.

However, the upper side of the first application 110 may not be connected to the lower side of the onscreen keyboard 150 in consideration that the first application 110 may be hidden from view by the user's hands when the user uses the onscreen keyboard 150.

The onscreen keyboard 150 is connected to the first application 110 in the three manners illustrated in FIGS. 3 to 5.

Examples of connecting/disconnecting the onscreen keyboard 150 to/from an application are described with reference to FIGS. 6 to 18. First, an example of automatically connecting the onscreen keyboard 150 to an application is described with reference to FIGS. 6 and 7.

Figure 6:
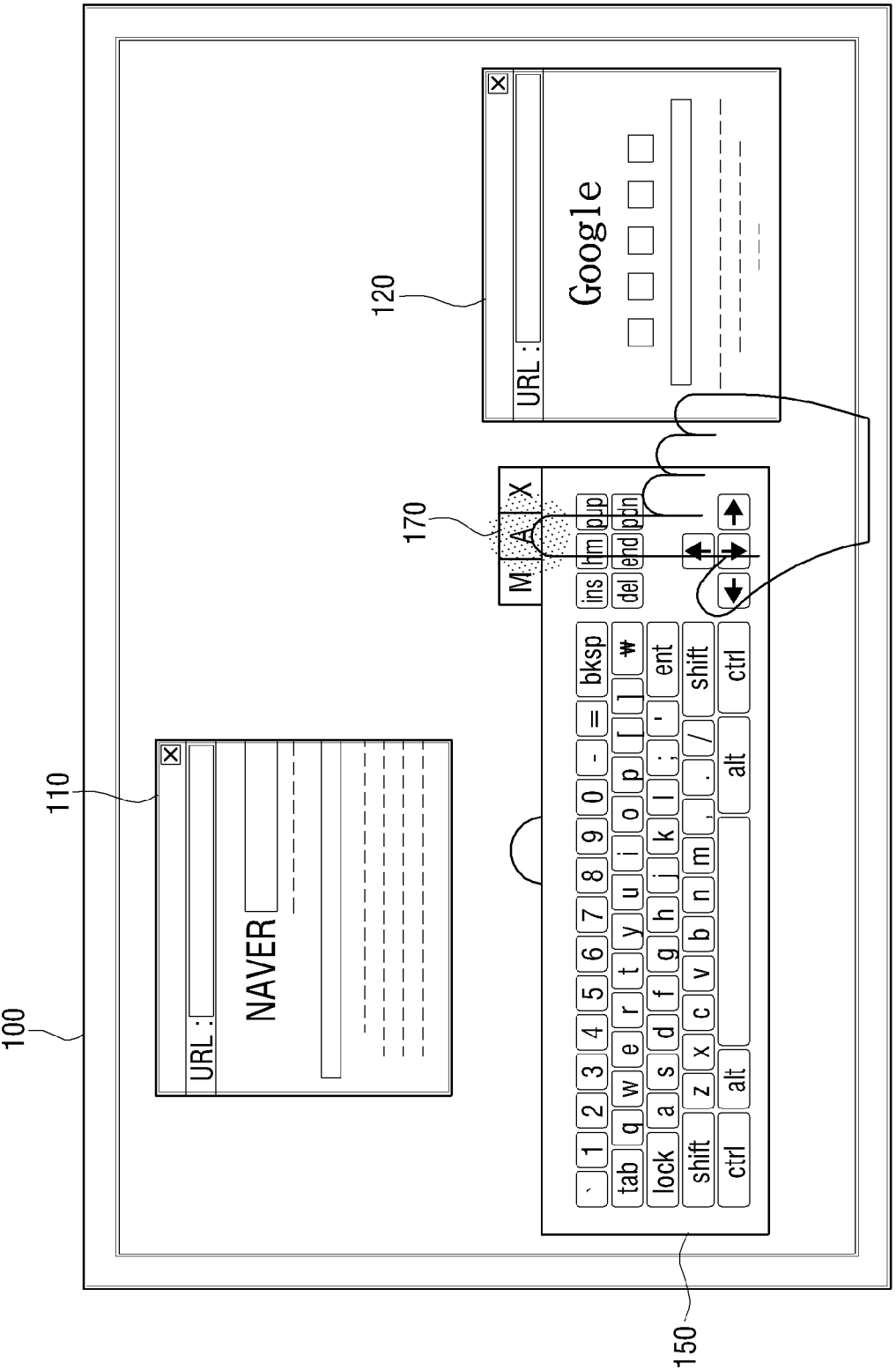
FIG. 6 is a diagram illustrating an example of a user touching an automatic connection button, according to an embodiment of the present invention.

FIG. 6 illustrates an example of the user touching the automatic connection button 170. Referring to FIG. 6, in response to the user touching the automatic connection button 170, the display apparatus 100 may select an application that is displayed in closest vicinity to the onscreen keyboard 150 as a target application for the onscreen keyboard 150. Since the second application 120 is located nearer than the first application 110 to the onscreen keyboard 150, as illustrated in FIG. 6, the display apparatus 100 may select the second application 120 as the target application of the onscreen keyboard 150.

Figure 7:
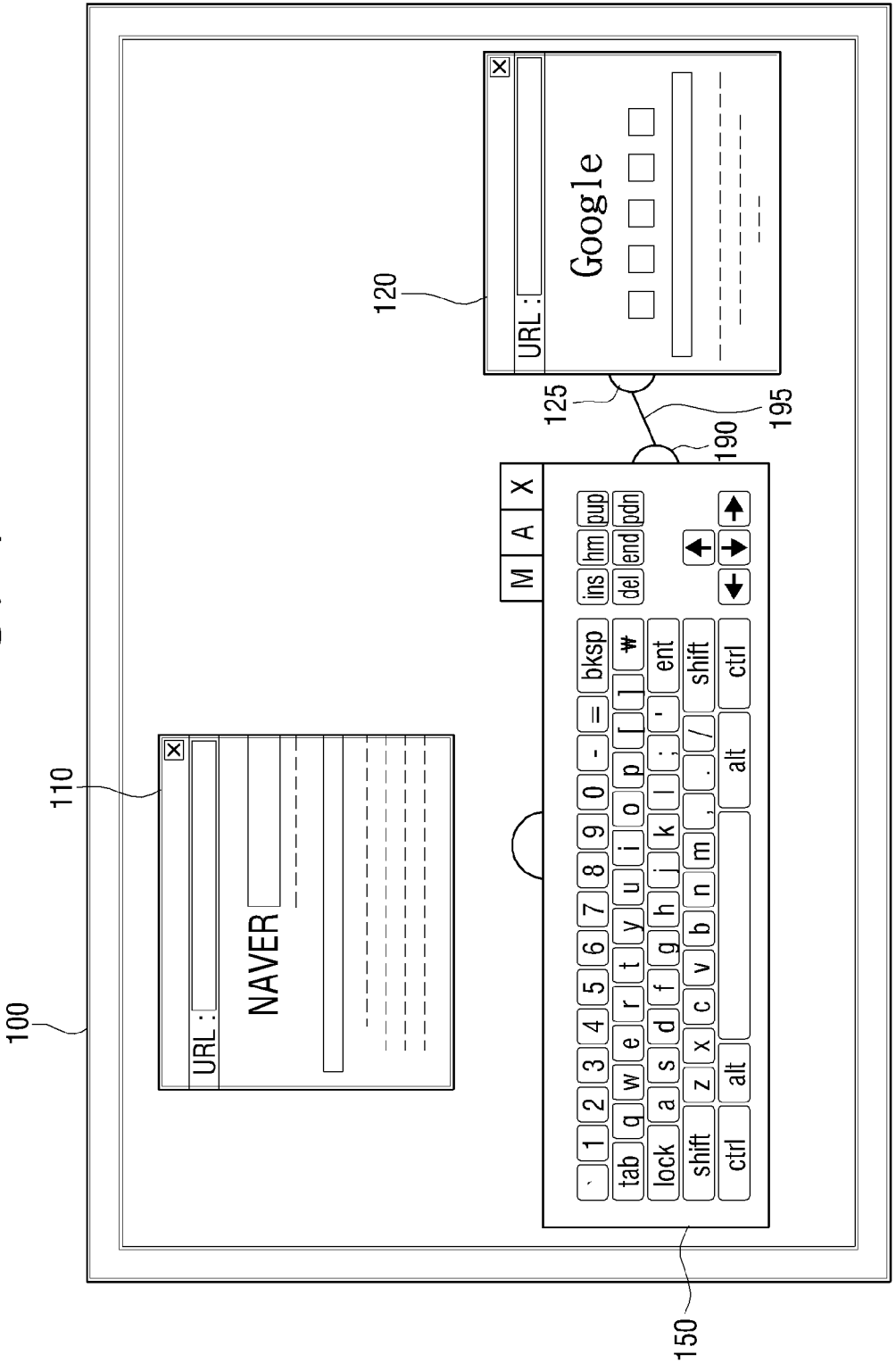
FIG. 7 is a diagram illustrating an example of a display screen that is displayed in response to the second application being selected as a target application of the onscreen keyboard by a display apparatus, according to an embodiment of the present invention.

FIG. 7 illustrates an example of a display screen that is displayed in response to the selection of the second application 120 as the target application of the onscreen keyboard 150 by the display apparatus 100. Referring to FIG. 7, the display apparatus 100 may connect the connection icon 125 of the second application 120 and the connection icon 190 of the onscreen keyboard 150 using the indicator 195, which is line-shaped, to visually indicate that the second application 120 is the target application of the onscreen keyboard 150.

Therefore, it is possible for the user to easily select the target application of the onscreen keyboard 150 simply by touching the automatic connection button 170.

An example of manually connecting the onscreen keyboard 150 and an application is described with reference to FIGS. 8 to 11.

Figure 8:
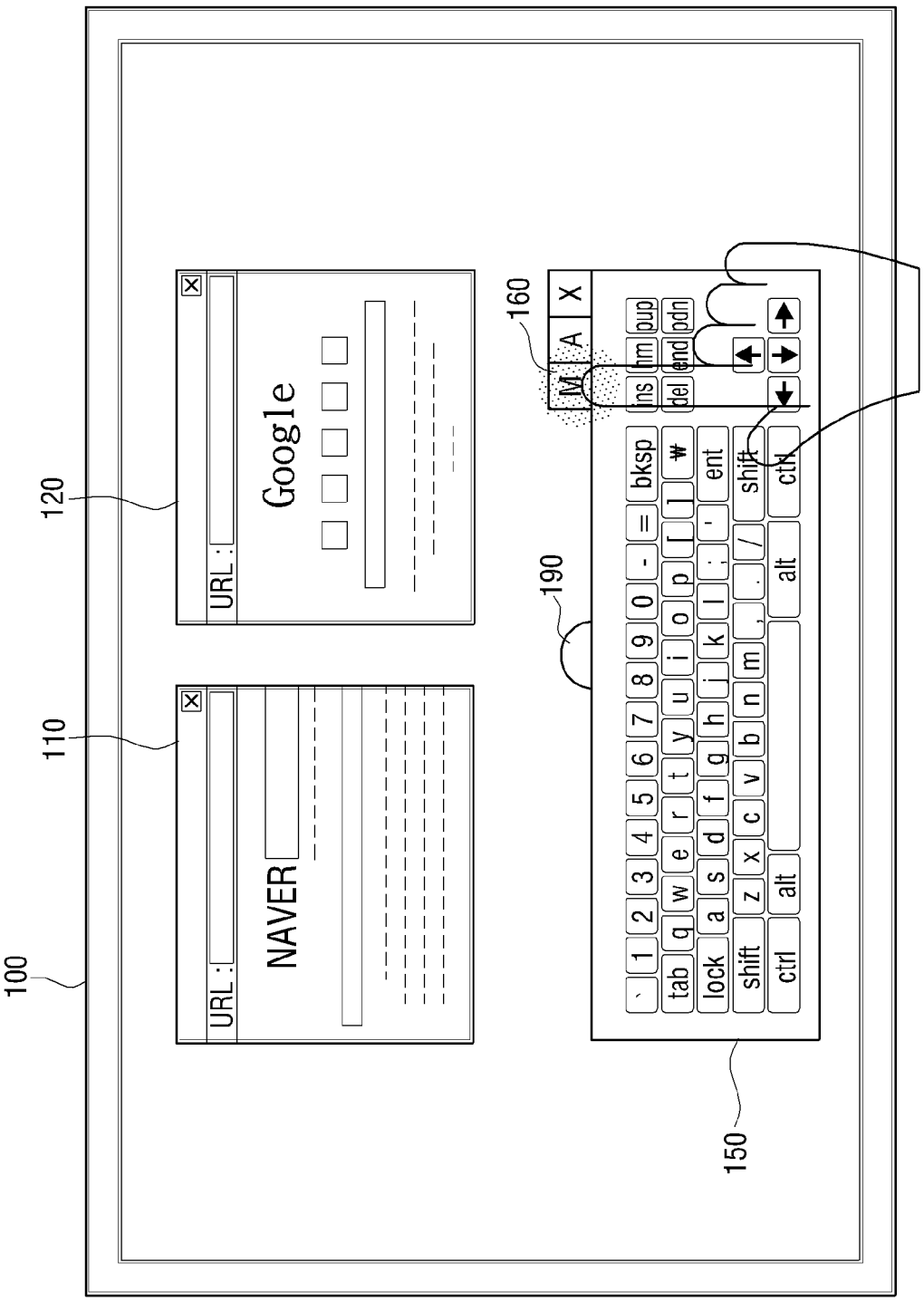
FIG. 8 is a diagram illustrating an example of a user touching a manual connection button, according to an embodiment of the present invention.

FIG. 8 illustrates an example of the user touching the manual connection button 160. Referring to FIG. 8, in response to the user touching the manual connection button 160, the display apparatus 100 may select one of the first and second applications 110 and 120 as the target application of the onscreen keyboard 150 in accordance with the user's subsequent manipulation of the onscreen keyboard 150.

Figure 9:
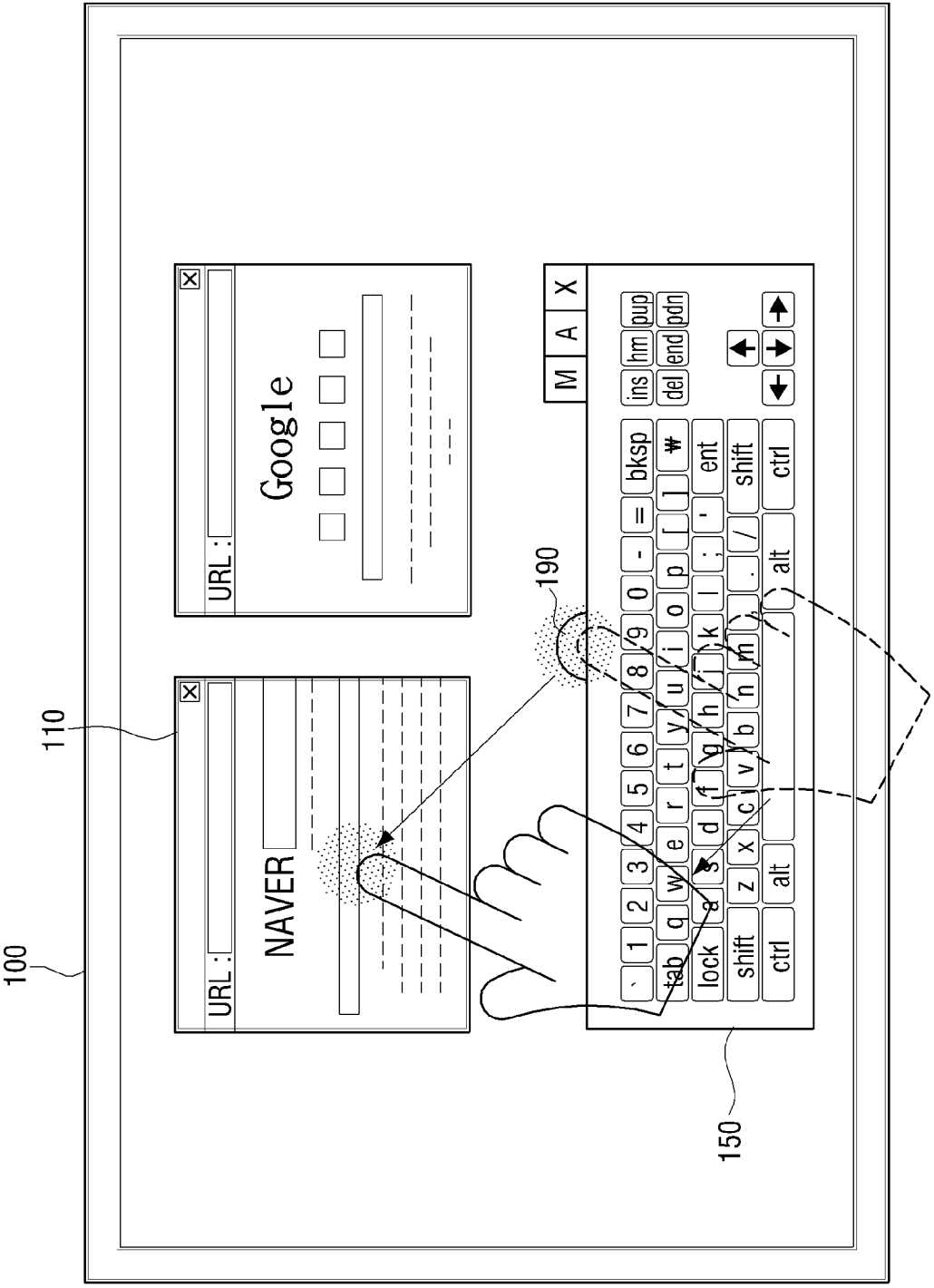
FIG. 9 is a diagram illustrating an example of a user dragging a connection icon and dropping it at the first application, according to an embodiment of the present invention.

FIG. 9 illustrates an example of the user dragging the connection icon 190 and dropping it at the first application 110. Referring to FIG. 9, in response to the user touching the manual connection button 160 and then dragging the connection icon 190 and dropping it at the first application 110, the display apparatus 100 may select the first application 110 as the target application of the onscreen keyboard 150.

Figure 10:
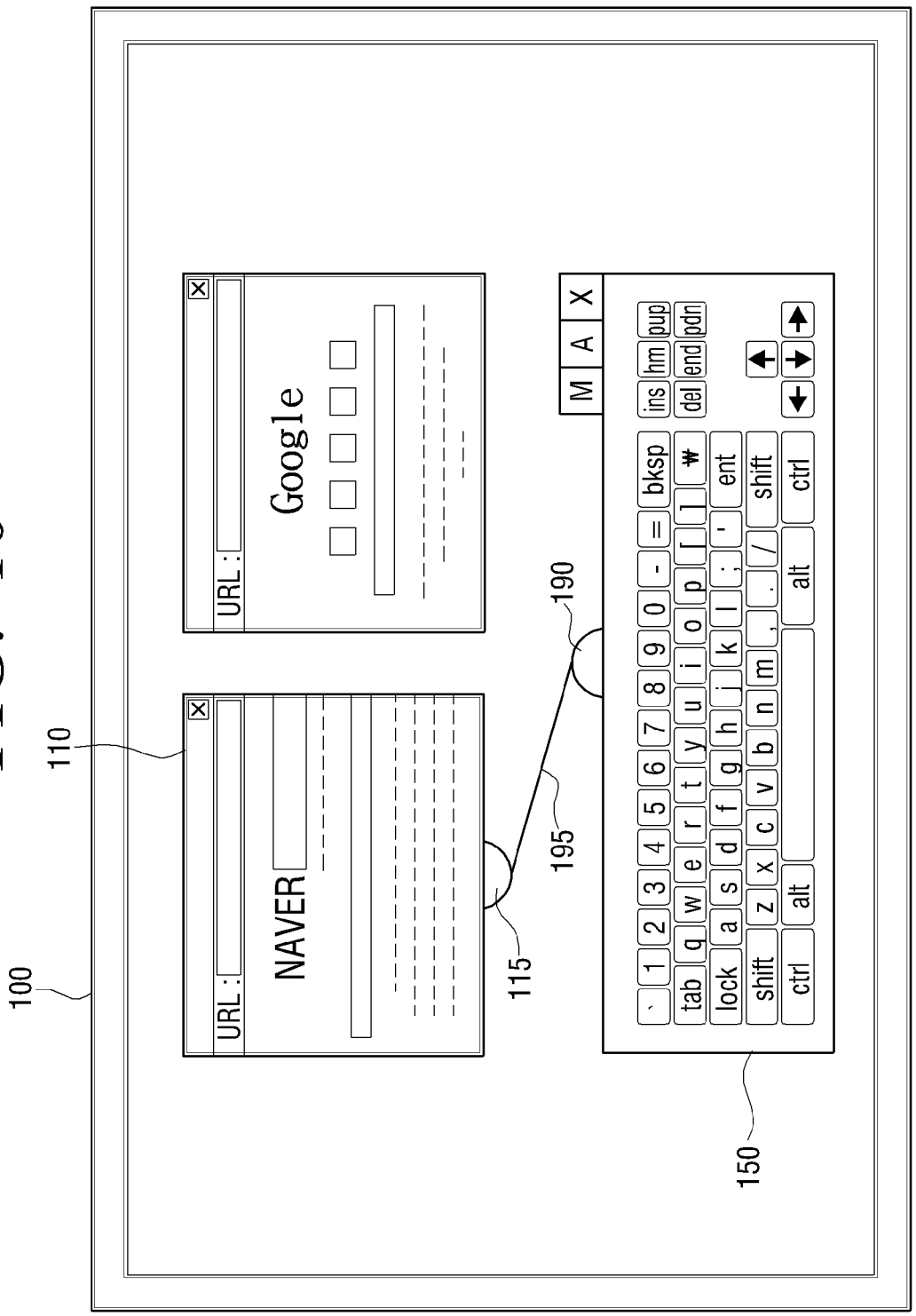
FIG. 10 is a diagram illustrating an example of a display screen that is displayed in response to the first application being selected as the target application of the onscreen keyboard by the display apparatus, according to an embodiment of the present invention.

FIG. 10 illustrates an example of a display screen that is displayed in response to the selection of the first application 110 as the target application of the onscreen keyboard 150 by the display apparatus 100. Referring to FIG. 10, the display device 100 may connect the connection icon 115 of the first application 110 and the connection icon 190 of the onscreen keyboard 150 using the indicator 195, which is line-shaped, to visually indicate that the first application 110 is the target application of the onscreen keyboard 150.

Figure 11:
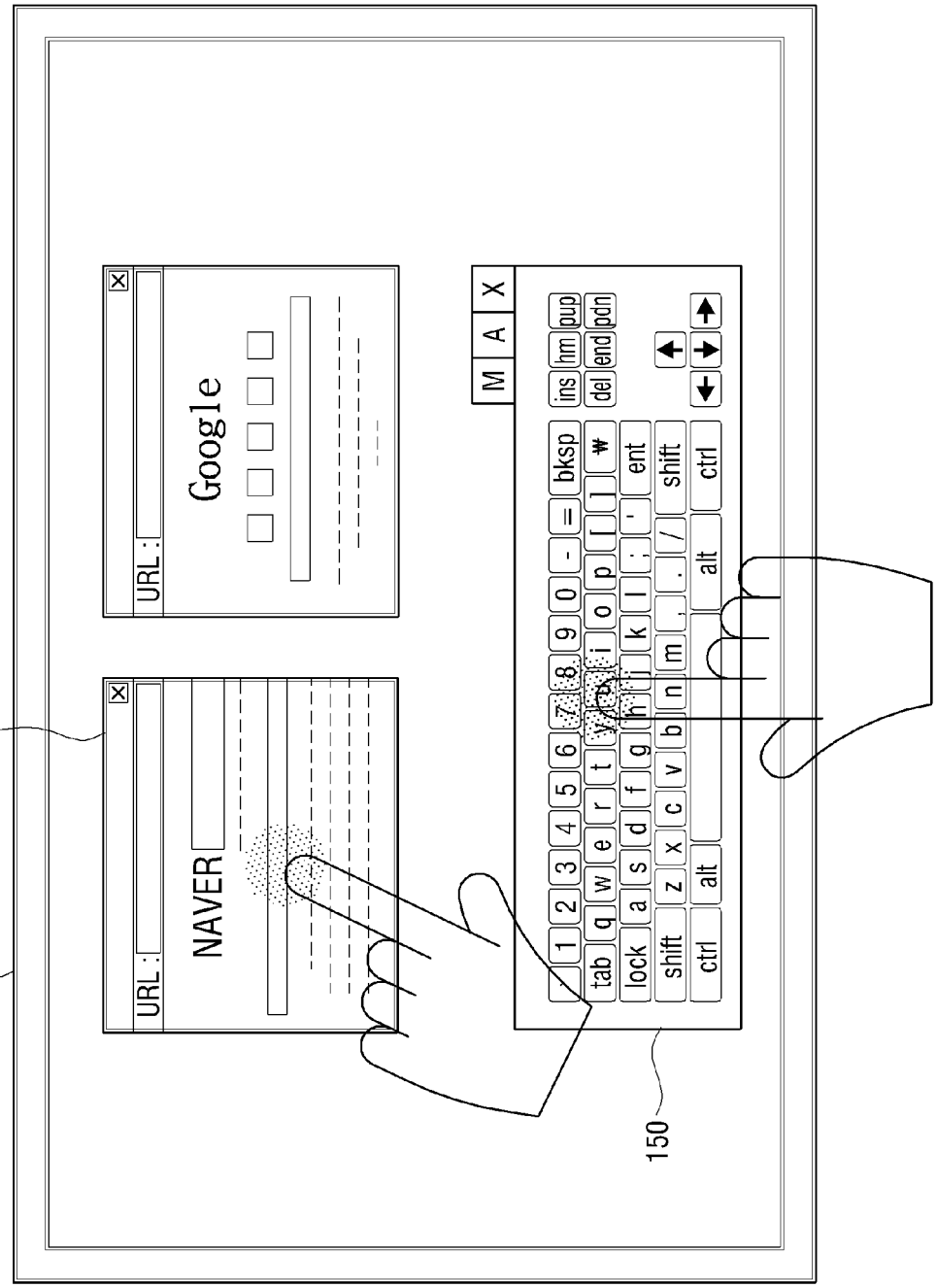
FIG. 11 is a diagram illustrating an example of a user touching both the first application and the onscreen keyboard at the same time, according to an embodiment of the present invention.

The display apparatus 100 may manually connect the onscreen keyboard 150 and an application in response to a dual touch input. FIG. 11 illustrates an example of the user touching both the first application 110 and the onscreen keyboard 150 at the same time.

Referring to FIG. 11, in response to the user touching the manual connection button 160 and then dual-touching the first application 110 and the onscreen keyboard 150, the display apparatus 100 may select the first application 110 as the target application of the onscreen keyboard 150. Then, as illustrated in FIG. 10, the display apparatus 100 may connect the connection icon 115 of the first application 110 and the connection icon 190 of the onscreen keyboard 150 using the indicator 195, which is line-shaped.

As described above, it is possible for the user to select a desired application as the target application of the onscreen keyboard 150 by touching the manual connection button 160 and entering a predefined type of input.

An example of changing the orientation of an application where the application and the onscreen keyboard 150 are displayed in different orientations is described with reference to FIGS. 12 to 14.

Figure 12:
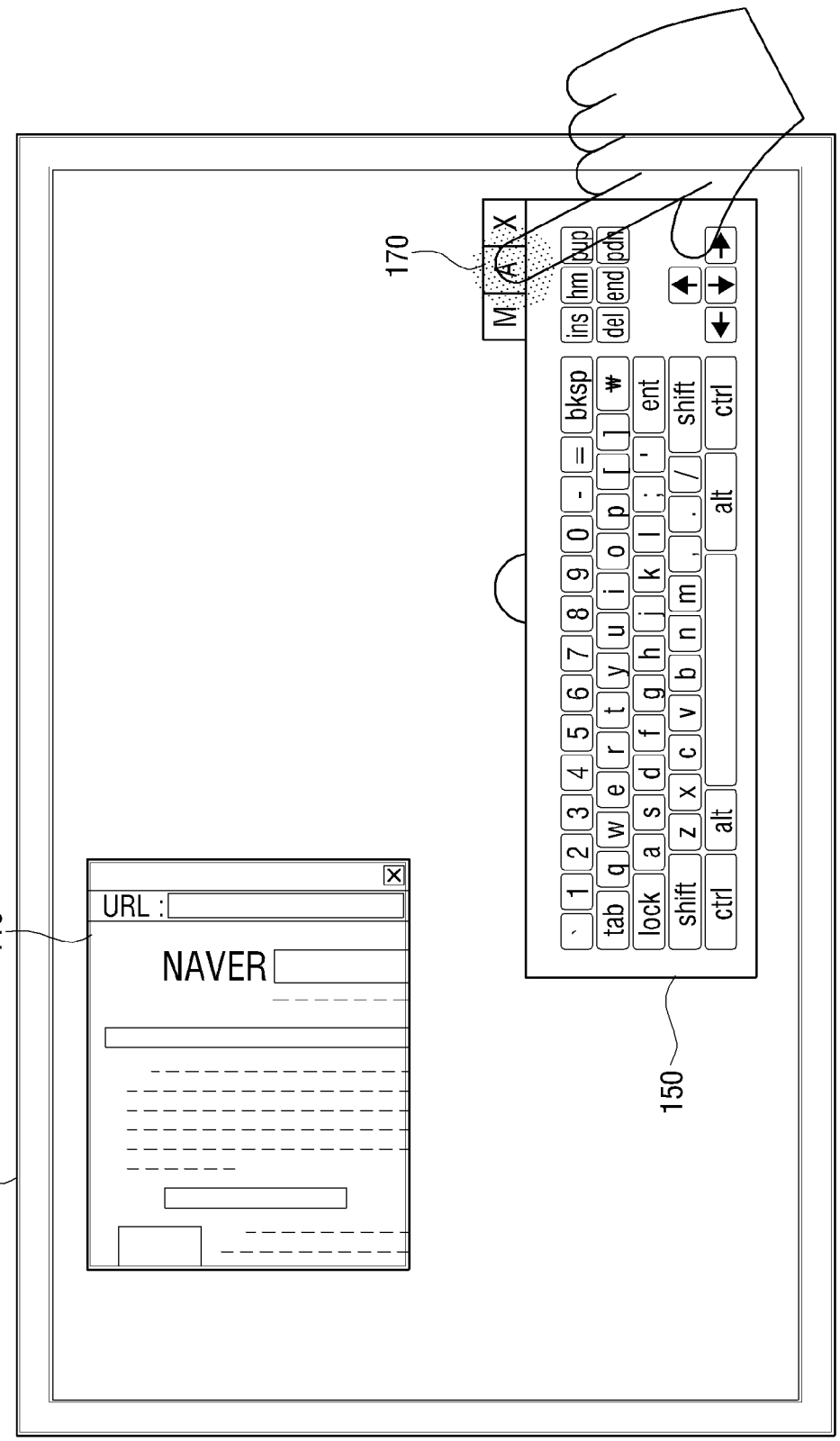
FIG. 12 is a diagram illustrating an example of a user touching the automatic connection button in response to the first application and the onscreen keyboard being displayed in different orientations, according to an embodiment of the present invention.

FIG. 12 illustrates an example of the user touching the automatic connection button 170 where the first application 110 and the onscreen keyboard 150 are displayed in different orientations.

Referring to FIG. 12, the first application 110 is displayed in such an orientation that the bottom of the first application 110 faces to the left, and the onscreen keyboard 150 is displayed in such an orientation that the bottom of the onscreen keyboard 150 faces downward. In this example, in response to the user touching the automatic connection button 170, the display apparatus 100 may select the first application 110 as the target application of the onscreen keyboard 150.

Figure 13:
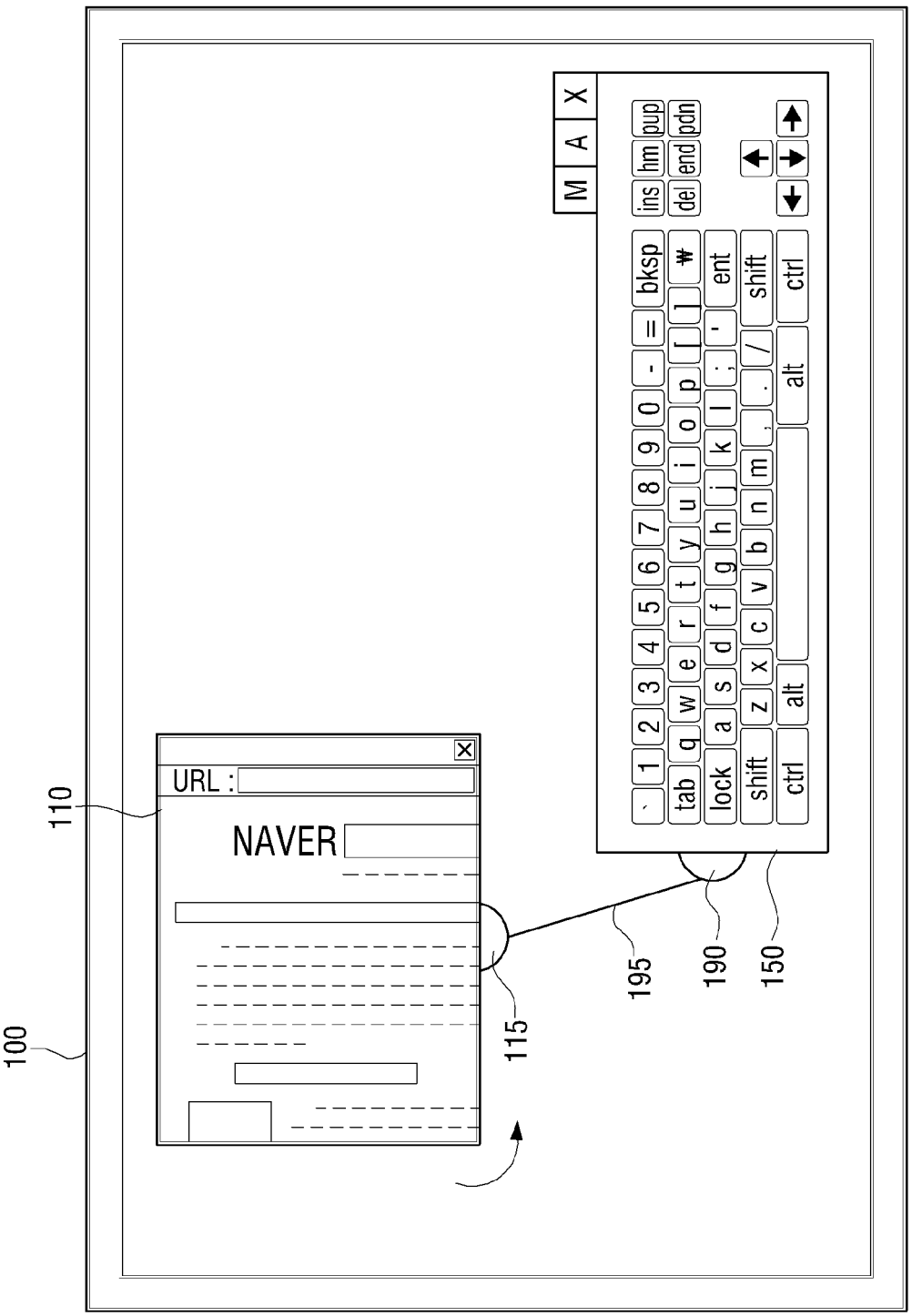
FIG. 13 is a diagram illustrating an example of a display screen that is displayed in response to the first application and the onscreen keyboard being displayed in different orientations and the first application being selected as the target application of the onscreen keyboard by the display apparatus, according to an embodiment of the present invention.

FIG. 13 illustrates an example of a display screen that is displayed in response to the selection of the first application 110 as the target application of the onscreen keyboard 150 by the display apparatus 100 where the first application 110 and the onscreen keyboard 150 are displayed in different orientations.

Referring to FIG. 13, the display apparatus 100 the may connect the connection icon 115 of the first application 110 and the connection icon 190 of the onscreen keyboard 150 using the indicator 195, which is line-shaped.

However, since the orientation of the first application 110 still does not coincide with the orientation of the onscreen keyboard 150, the user may not be able to properly view the first application 110. Therefore, the display apparatus 100 may change the orientation of the first application 110 so that the first application 110 is displayed in the same orientation as the onscreen keyboard 150.

Figure 14:
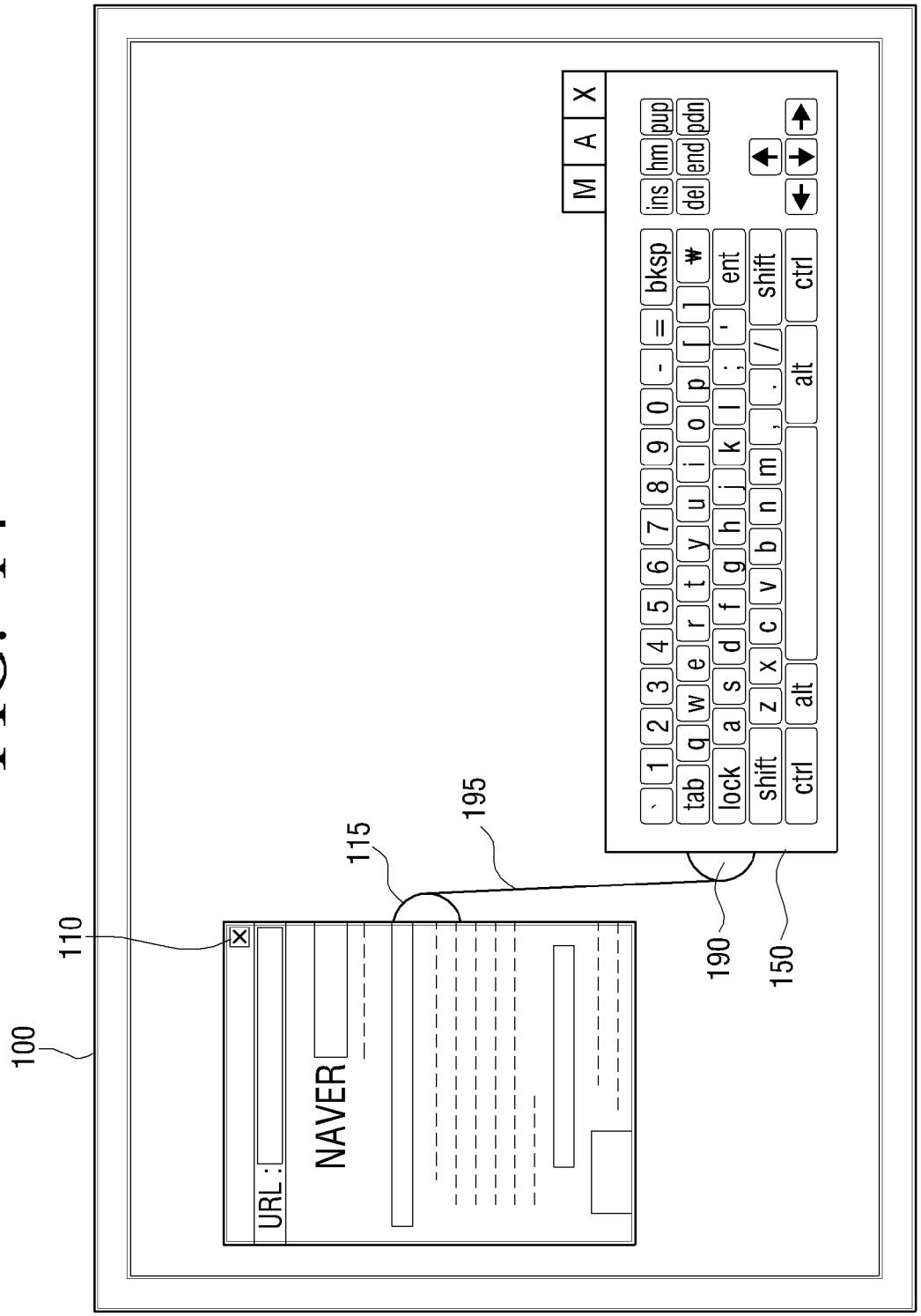
FIG. 14 is a diagram illustrating an example of rotating the first application counterclockwise by 90 degrees, according to an embodiment of the present invention.

FIG. 14 illustrates an example of rotating the first application 110 counterclockwise by 90 degrees. Referring to FIG. 14, the first application 110 is rotated counterclockwise by 90 degrees so that the orientation of the first application 110 may coincide with the orientation of the onscreen keyboard 150.

In the example illustrated in FIG. 14, the display apparatus 100 rotates the first application 110 to change the orientation of the first application 110. In another example, the display apparatus 100 may rotate the onscreen keyboard 150. That is, the display apparatus 100 may change the orientation of the onscreen keyboard 150 or the first application 110 so that the onscreen keyboard 150 and the first application 110 may have the same orientation.

As such, it is possible to improve the convenience of the use of the onscreen keyboard 150 for entering text for the first application 110.

An example of disconnecting the connection between an application and the onscreen keyboard 150 is described with reference to FIGS. 15 to 18.

Figure 15:
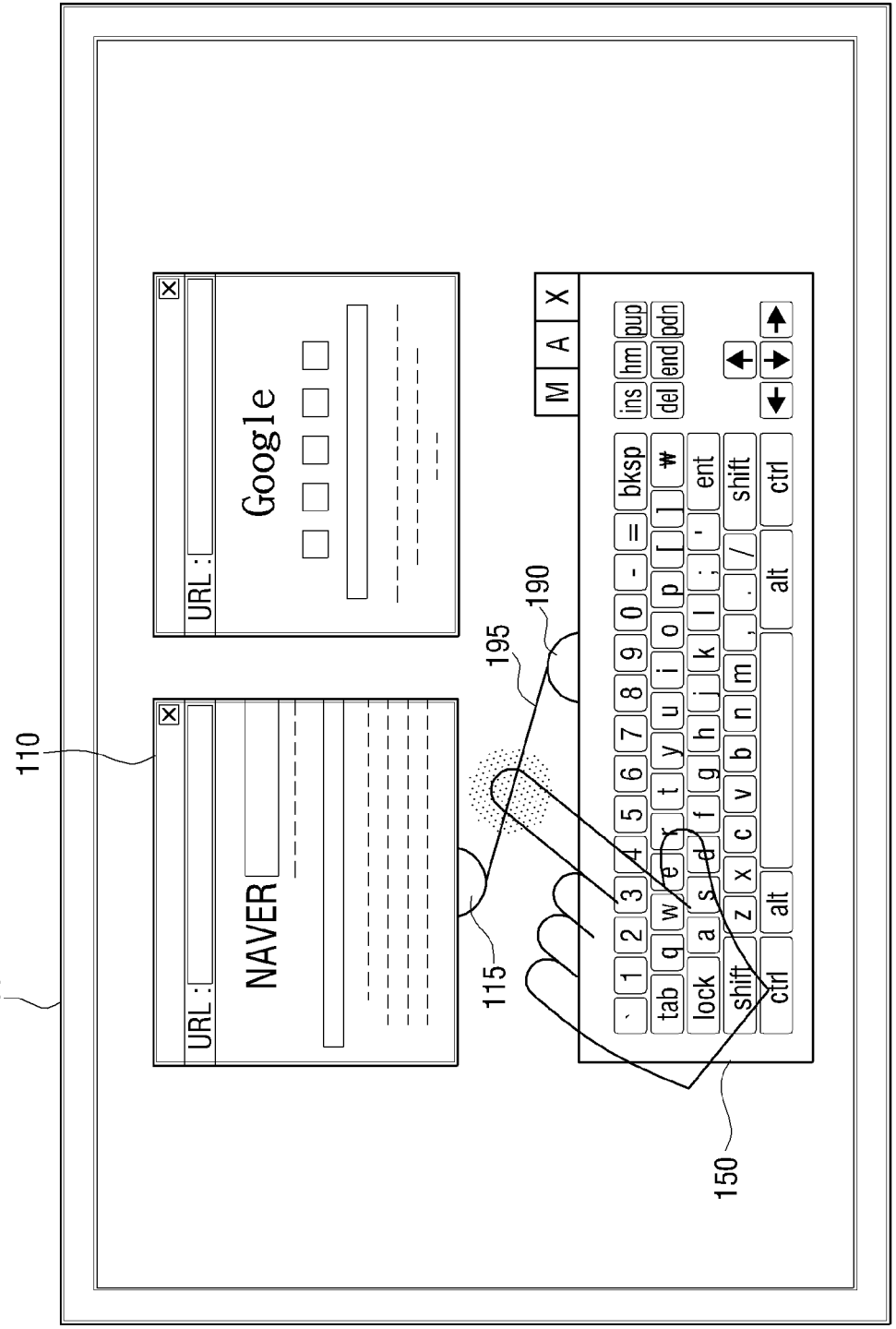
FIG. 15 is a diagram illustrating an example of a user touching a line-shaped indicator, according to an embodiment of the present invention.
Figure 16:
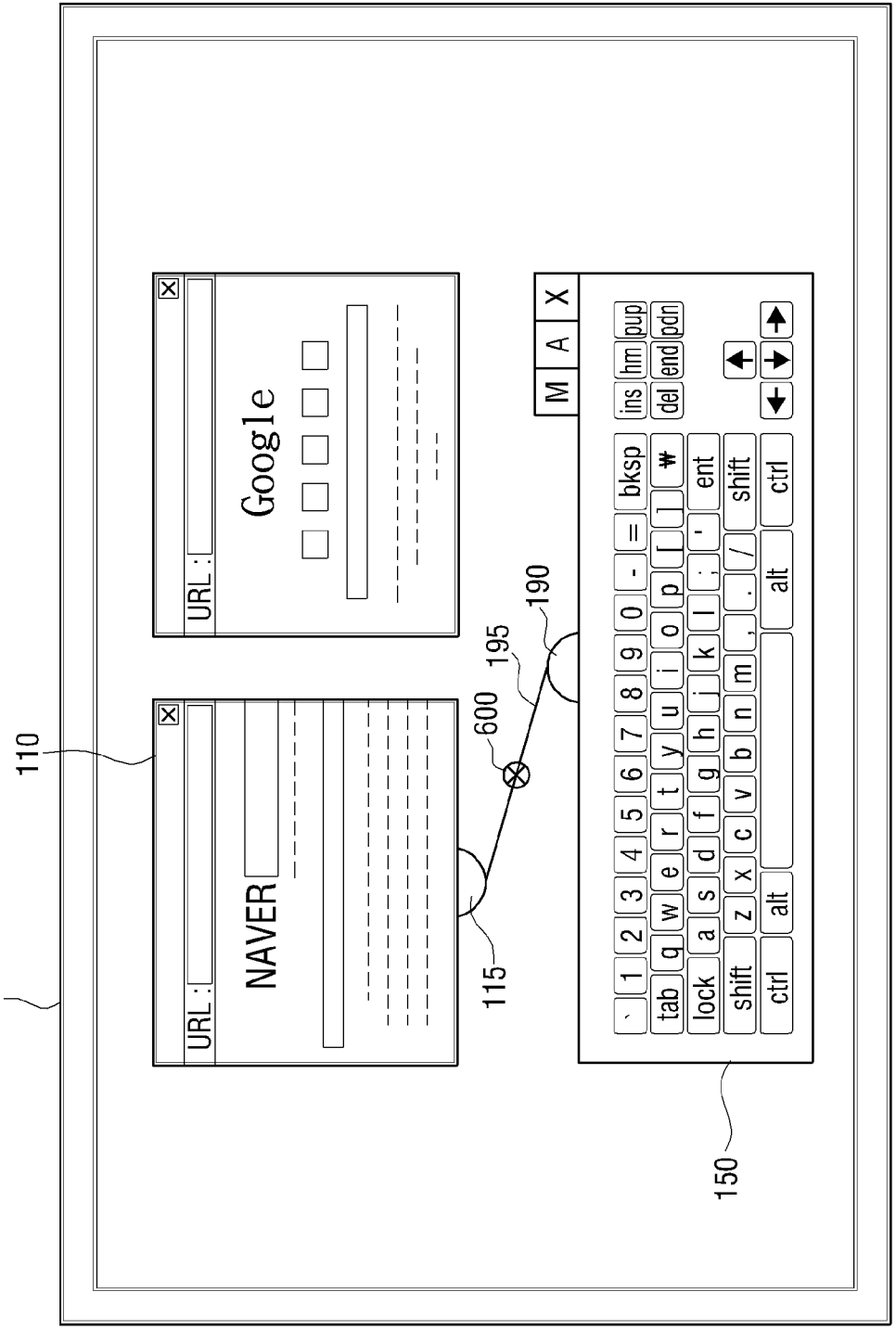
FIG. 16 is a diagram illustrating an example of displaying a disconnection button on a line-shaped indicator, according to an embodiment of the present invention.

FIG. 15 illustrates an example of the user touching the indicator 195, which is line-shaped, and FIG. 16 illustrates an example of a display screen that displays a disconnection button 600 on the indicator 195.

Referring to FIG. 15, in response to the user touching the indicator 195, the display apparatus 100 may determine that a command to display the disconnection button 600 on the indicator 195 has been issued. Accordingly, referring to FIG. 16, the display apparatus 100 may display the disconnection button 600 on the indicator 195.

Figure 17:
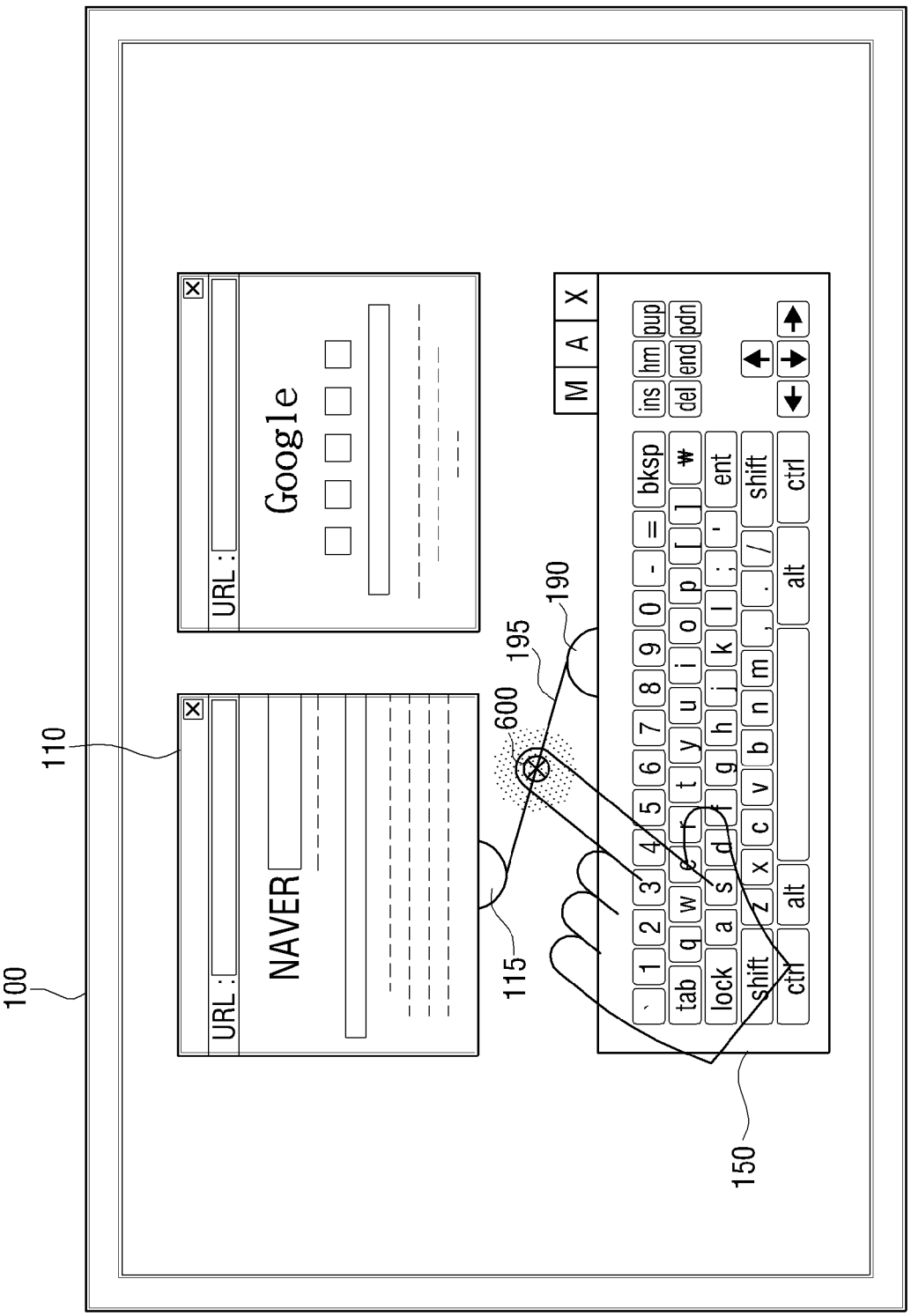
FIG. 17 is a diagram illustrating an example of a user touching a disconnection button 600, according to an embodiment of the present invention.
Figure 18:
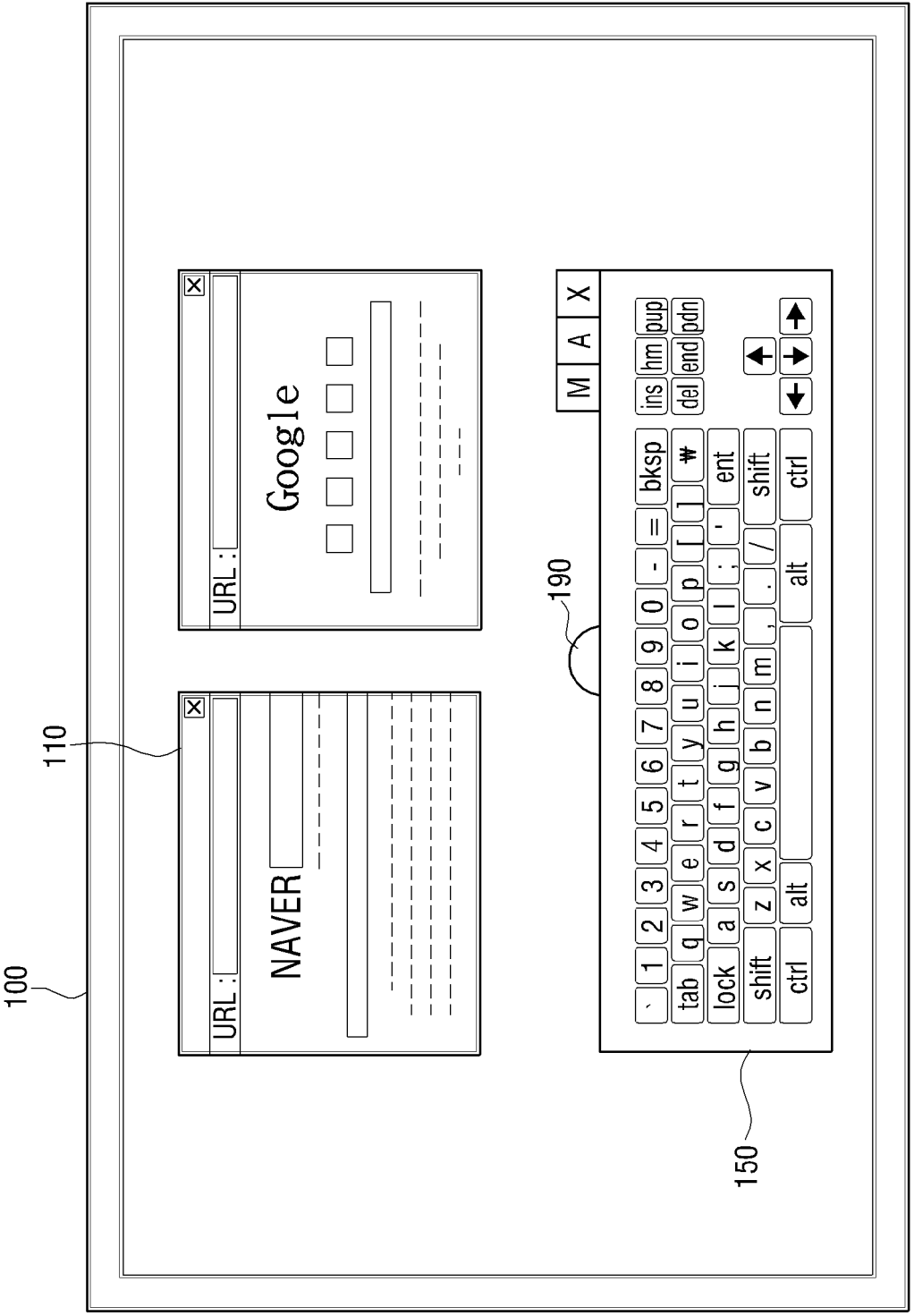
FIG. 18 is a diagram illustrating an example of a display screen that is displayed in response to the connection between a first application 110 and an onscreen keyboard 150 being disconnected, according to an embodiment of the present invention.

FIG. 17 illustrates an example of the user touching the disconnection button 600, and FIG. 18 illustrates an example of a display screen that is displayed in response to the connection between the first application 110 and the onscreen keyboard 150 being disconnected.

Referring to FIG. 17, in response to the user touching the disconnection button 600, the display apparatus 100 may disconnect the connection between the first application 110 and the onscreen keyboard 150.

Accordingly, referring to FIG. 18, the display apparatus 100 may remove the indicator 195, which connects the first application 110 and the onscreen keyboard 150.

As such, it is possible for the user to disconnect the connection between the first application 110 and the onscreen keyboard 150.

Figure 19:
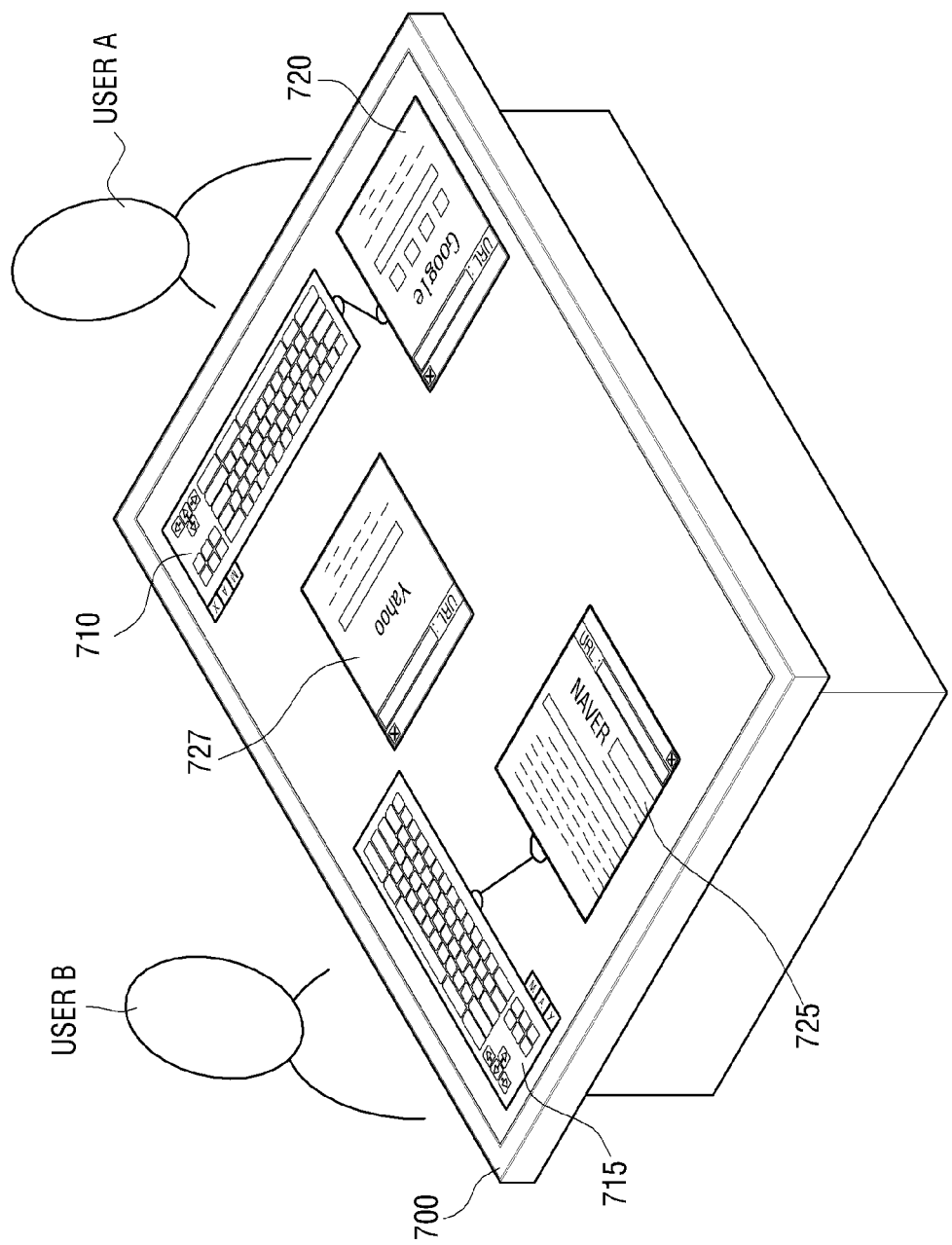
FIG. 19 is a diagram illustrating an example of a case in which a tabletop device 700 is used by two users, according to an embodiment of the present invention.

An example of allowing a plurality of users to use a plurality of applications and a plurality of onscreen keyboards is described with reference to FIG. 19. FIG. 19 illustrates an example of allowing two users to use a tabletop device 700.

Referring to FIG. 19, user A and user B may use the tabletop device 700 together, and a first onscreen keyboard 710, a second onscreen keyboard 720, a third application 720, a fourth application 725, and a fifth application 727 is displayed on the screen of the tabletop device 700.

User A may use the first onscreen keyboard 710 in connection with the third application 720, and user B may use the second onscreen keyboard 715 in connection with the fourth application 725.

As such, it is possible for a user to easily select the target application of an onscreen keyboard from among a plurality of applications and intuitively identify which of the plurality of applications is the target application of the onscreen keyboard. In addition, it is possible for a plurality of users to use a plurality of onscreen keyboards, respectively.

In the example illustrated in FIG. 19, the tabletop device 700 is used as an example of a display apparatus. However, the example illustrated in FIG. 19 may be applied to various types of display apparatuses, other than the tabletop device 700, as long as they are equipped with a touch screen. For example, the example illustrated in FIG. 19 may be applied to a smart board, a Television (TV), a tablet device, and the like.

Figure 20:
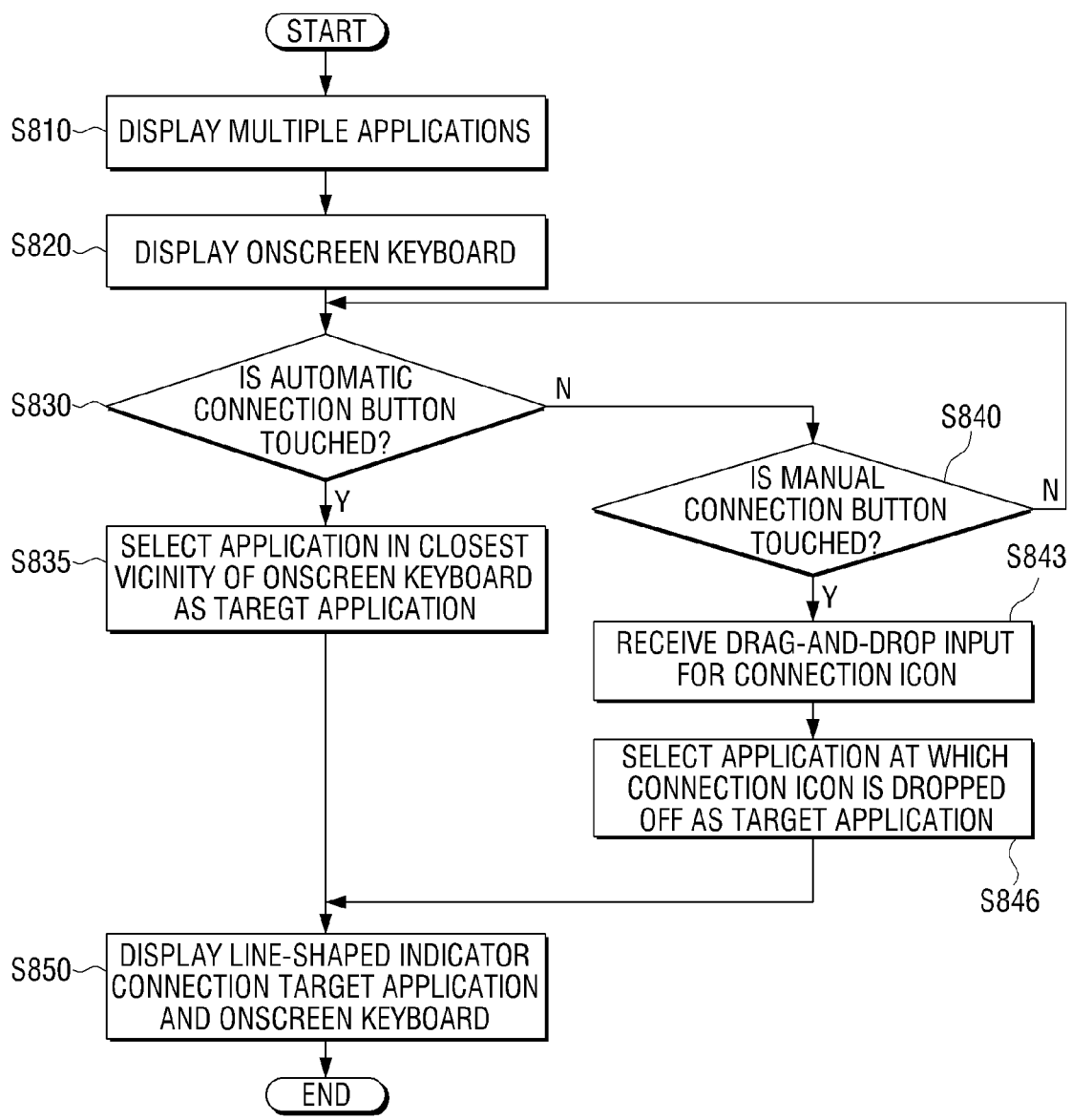
FIG. 20 is a flowchart illustrating a method of providing a UI, according to an embodiment of the present invention, according to an embodiment of the present invention.

A method of providing a UI for selecting the target application of an onscreen keyboard from among a plurality of applications has been described above with reference to FIGS. 1 to 19. The method is further described with reference to FIG. 20. FIG. 20 is a flowchart illustrating a method of providing a UI according to an embodiment of the present invention.

Referring to FIG. 20, the display apparatus 100 may display a plurality of applications on its screen in step 810. The display apparatus 100 may also display an onscreen keyboard on its screen in step 820.

In response to a user touching an automatic connection button on the onscreen keyboard in step 830-Y, the display apparatus 100 may select an application that is located in closest vicinity to the onscreen keyboard as the target application of the onscreen keyboard in step 835. The display apparatus 100 displays an indicator, which is line-shaped, between the selected application and the onscreen keyboard, so that the selected application and the onscreen keyboard are connected by the indicator in step 850. Steps 830, 835, and 850 may become more apparent with reference to FIGS. 6 and 7.

In response to the user touching a manual connection button on the onscreen keyboard in step 840-Y, the display apparatus 100 may select the target application of the onscreen keyboard in accordance with the user's subsequent manipulation of the onscreen keyboard. For example, in response to the user dragging a connection icon on the onscreen keyboard and dropping it at one of the plurality of applications in step 843, the display apparatus 100 may select the application at which the connection icon is dropped as the target application of the onscreen keyboard in step 846. Thereafter, the display apparatus 100 may display an indicator, which is line-shaped, between the selected application and the onscreen keyboard so that the selected application and the onscreen keyboard may be connected by the indicator in step 850. Steps 830, 835, and 850 will be more apparent with reference to FIGS. 8 to 10. In another example, the display apparatus 100 may select one of the plurality of applications as the target application of the onscreen keyboard in response to the receipt of a dual touch input from the user.

As such, the apparatus 100 may provide a UI for selecting one of the plurality of applications as the target application of the onscreen keyboard.

Figure 21:
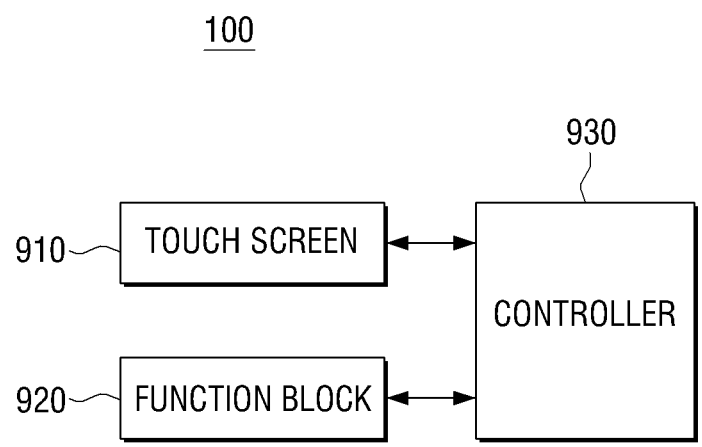
FIG. 21 is a block diagram illustrating a display device, according to an embodiment of the present invention.

FIG. 21 is a block diagram of a display apparatus according to the present invention. Referring to FIG. 21, the display apparatus 100 includes a touch screen 910, a function block 920, and a controller 930.

The touch screen 910 receives a touch input from a user, and displays an onscreen keyboard and a plurality of applications in response to the received touch input. Referring to FIG. 1, the touch screen 910 displays a plurality of applications and an onscreen keyboard thereon at the same time.

The function block 820 may perform the general functions of the display apparatus 100. For example, in response to the display apparatus 100 being a tabletop device, the function block 810 may perform the functions of a tabletop device. In another example, in response to the display apparatus 100 being a smart board for use in a digital conference, the function block 810 may perform the functions of a smart board.

The controller 930 may select one of the applications displayed on the touch screen 910 as the target application of the onscreen keyboard in response to the user's manipulation of the onscreen keyboard by performing the method illustrated in FIG. 20. The controller 930 may realize the functions of the display apparatus 100 that are described above with reference to FIGS. 1 to 19.

In the example illustrated in FIG. 20, the display apparatus 100 may select one of a plurality of applications as the target application of an onscreen keyboard and may connect the onscreen keyboard and the selected application. The example illustrated in FIG. 20 may be applied to various command input tools, other than an onscreen keyboard, that may be displayed on a touch screen. For example, the example illustrated in FIG. 20 may be applied to a touch wheel, a touch direction-input tool, a touch number keypad, and the like.

As described above, according the present invention, it is possible to provide a method of providing a UI that selects one of a plurality of applications as a target application into which to enter text using an onscreen keyboard in response to a user's manipulation of the onscreen keyboard and a display apparatus to which the method is applied. Therefore, it is possible for a user to easily use the onscreen keyboard even where a plurality of applications are displayed at the same time.

Since the onscreen keyboard is connected to the target application, it is possible for the user to easily identify the target application.

While the present invention has been shown and described with reference to various embodiments thereof, the present invention can be readily applied to other types of apparatuses. The description of the various embodiments is intended to be illustrative, and it will be apparent to those of ordinary skill in the art that various modifications and variation in form and detail can be made without departing from the spirit or scope of the present invention, as defined by the appended claims.

The invention claimed is:

1. A method of providing a User Interface (UI), the method comprising:
displaying an onscreen keyboard on a screen;
displaying a plurality of applications on the screen;
selecting one of the plurality of applications as a an application for entering text using the onscreen keyboard;
displaying a first visual element between the selected application and the onscreen keyboard, the first visual element indicating that the selected application is connected with the onscreen keyboard for entering text on the selected application using the onscreen keyboard; and
in response to receiving a touch input on the first visual element, displaying a second visual element on the first visual element for disconnecting the selected application from the onscreen keyboard, and cancelling the selection.

2. The method of claim 1, wherein displaying the first visual element comprises displaying a line-shaped indicator that connects the selected application and the onscreen keyboard.

3. The method of claim 1, wherein displaying the second visual element comprises:
displaying a disconnection button for entering a command to disconnect the connection between the selected application and the onscreen keyboard.

4. The method of claim 1, wherein selecting one of the applications comprises, in response to a first manipulation of the onscreen keyboard, selecting an application that is displayed in closest vicinity to the onscreen keyboard as the target application of the onscreen keyboard.

5. The method of claim 4, wherein the first manipulation of the onscreen keyboard comprises touching an automatic connection button that is included in the onscreen keyboard.

6. The method of claim 1, wherein selecting the one of the plurality of applications comprises, in response to a second manipulation of the onscreen keyboard, selecting the one of the plurality of applications as the application for entering text using the onscreen keyboard in accordance with a third manipulation of the selected onscreen keyboard that follows the second manipulation of the onscreen keyboard.

7. The method of claim 6, wherein the second manipulation of the onscreen keyboard comprises touching a manual connection button that is included in the onscreen keyboard.

8. The method of claim 6, wherein the third manipulation of the onscreen keyboard comprises dragging a predefined icon that is included in the onscreen keyboard and dropping the predefined icon at the one of the plurality of applications, and selecting the one of the plurality of applications comprises selecting an application at which the predefined icon is dropped as the application for entering text using the onscreen keyboard.

9. The method of claim 6, wherein the third manipulation of the onscreen keyboard comprises dual-touching the onscreen keyboard and the one of the plurality of applications, and selecting the one of the plurality of applications comprises selecting an application dual-touched along with the onscreen keyboard as the application for entering text using the onscreen keyboard.

10. The method of claim 1, further comprising:
in response to the selected application and the onscreen keyboard being displayed in different orientations, changing the orientation of the onscreen keyboard or the selected application so that the onscreen keyboard and the selected application are displayed in the same orientation.

11. The method of claim 1, wherein displaying the first visual element comprises displaying the first visual element on at least one of a right side, a left side, a top side, and a bottom side of the selected application.

12. A display apparatus comprising:
a touch screen which receives a touch input from one or more users and displays an onscreen keyboard and a plurality of applications thereon; and
a controller which
selects one of the plurality of applications as an application for entering text using the onscreen keyboard, in response to a user manipulation for the onscreen keyboard via the touch screen,
controls a first visual element to be displayed between the selected application and the onscreen keyboard, the first visual element indicating that the selected application is connected with the onscreen keyboard for entering text on the selected application using the onscreen keyboard, and
in response to receiving, via the touch screen, a touch input on the first visual element, displays a second visual element on the first visual element for disconnecting the selected application from the onscreen keyboard, and cancelling the selection.

13. The display apparatus of claim 12, wherein the controller displays a line-shaped indicator that connects the selected application and the onscreen keyboard.

14. The display apparatus of claim 12, wherein, in response to receiving the touch input on the first visual element, the controller controls a disconnection button for entering a command to disconnect the connection between the selected application and the onscreen keyboard to be displayed on the touch screen.

15. The display apparatus of claim 12, wherein, in response to a first manipulation of the onscreen keyboard, the controller selects an application that is displayed in closest vicinity to the onscreen keyboard as the target application of the onscreen keyboard.

16. The display apparatus of claim 15, wherein the first manipulation of the onscreen keyboard comprises touching an automatic connection button that is included in the onscreen keyboard.

17. The display apparatus of claim 12, wherein, in response to a second manipulation of the onscreen keyboard, the controller selects the one of the plurality of applications as the application for entering text using the onscreen keyboard in accordance with a third manipulation of the onscreen keyboard that follows the second manipulation of the onscreen keyboard.

18. The display apparatus of claim 17, wherein the second manipulation of the onscreen keyboard comprises touching a manual connection button that is included in the onscreen keyboard.

19. The display apparatus of claim 17, wherein the third manipulation of the onscreen keyboard comprises dragging a predefined icon that is included in the onscreen keyboard and dropping the predefined icon at the one of the plurality of applications, and the controller selects an application at which the predefined icon is dropped as the application for entering text using the onscreen keyboard.

20. The display apparatus of claim 17, wherein the third manipulation of the onscreen keyboard comprises dual-touching the onscreen keyboard and the one of the plurality of applications, and the controller selects an application dual-touched along with the onscreen keyboard as the application for entering text using the onscreen keyboard.

21. The display apparatus of claim 12, wherein, in response to the selected application and the onscreen keyboard being displayed in different orientations, the controller changes the orientation of the onscreen keyboard or the selected application so that the onscreen keyboard and the selected application are displayed in the same orientation.

22. The display apparatus of claim 12, wherein the controller displays the first visual element on at least one of a right side, a left side, a top side, and a bottom side of the selected application.

23. A method of providing a UI, the method comprising:
- displaying a command input tool on a screen;
- displaying a plurality of applications on the screen;
- selecting one of the plurality of applications as an application for entering text using the command input tool, in response to a user manipulation for the command input tool;
- displaying a first visual element between the selected application and the command input tool, the first visual element indicating that the selected application is connected with the command input tool for entering text on the selected application using the command input tool; and
- in response to receiving a touch input on the first visual element, displaying a second visual element on the first visual element for disconnecting the selected application from the command input tool and cancelling the selection.

24. A display apparatus comprising:
- a touch screen which receives a touch input from one or more users and displays a command input tool and a plurality of applications thereon; and
- a controller which
    - selects one of the plurality of applications as an application for entering text using the command input tool, in response to a user manipulation for the command input tool via the touch screen,
    - displays a first visual element between the selected application and the command input tool, the first visual element indicating that the selected application is connected with the command input tool for entering text on the selected application using the command input tool, and
    - in response to receiving, via the touch screen, a touch input on the first visual element, displays a second visual element on the first visual element for disconnecting the selected application from the command input tool, and cancelling the selection.

* * * * *